United States Patent [19]
Dane et al.

[11] Patent Number: 5,880,873
[45] Date of Patent: Mar. 9, 1999

[54] ALL SOLID-STATE SBS PHASE CONJUGATE MIRROR

[75] Inventors: Clifford B. Dane; Lloyd A. Hackel, both of Livermore, Calif.

[73] Assignee: The Regents of the University of California, Oakland, Calif.

[21] Appl. No.: 857,988

[22] Filed: May 16, 1997

[51] Int. Cl.[6] .............................. G02B 26/08; M01S 3/08
[52] U.S. Cl. ............................................... 359/300; 372/99
[58] Field of Search ......................... 372/99, 92; 359/300

[56] References Cited

U.S. PATENT DOCUMENTS

| 5,255,283 | 10/1993 | Belanger et al. | 372/99 |
| 5,379,147 | 1/1995 | Cook | 359/300 |
| 5,402,261 | 3/1995 | Huignard et al. | 359/300 |
| 5,729,380 | 3/1998 | Betin et al. | 359/300 |

OTHER PUBLICATIONS

B. N. Borisov et al., "Wavefront inversion in induced Mandel'shtam–Brillouin scattering in a glass without failure", Sov. Phys. Tech. Phys. 25, pp. 645–646, May 1980.

A. M. Scott et al. "Methods for SBS Treshold Reduction," Naval Research Laboratory, Washington, DC 20375, Report No. NRL/FR/5460—94–9704, Jan. 30, 1994.

*Primary Examiner*—James W. Davie
*Attorney, Agent, or Firm*—John P. Wooldridge

[57] ABSTRACT

A stimulated Brillouin scattering (SBS) phase conjugate laser mirror uses a solid-state nonlinear gain medium instead of the conventional liquid or high pressure gas medium. The concept has been effectively demonstrated using common optical-grade fused silica. An energy threshold of 2.5 mJ and a slope efficiency of over 90% were achieved, resulting in an overall energy reflectivity of >80% for 15 ns, 1 um laser pulses. The use of solid-state materials is enabled by a multi-pass resonant architecture which suppresses transient fluctuations that would otherwise result in damage to the SBS medium. This all solid state phase conjugator is safer, more reliable, and more easily manufactured than prior art designs. It allows nonlinear wavefront correction to be implemented in industrial and defense laser systems whose operating environments would preclude the introduction of potentially hazardous liquids or high pressure gases.

23 Claims, 4 Drawing Sheets

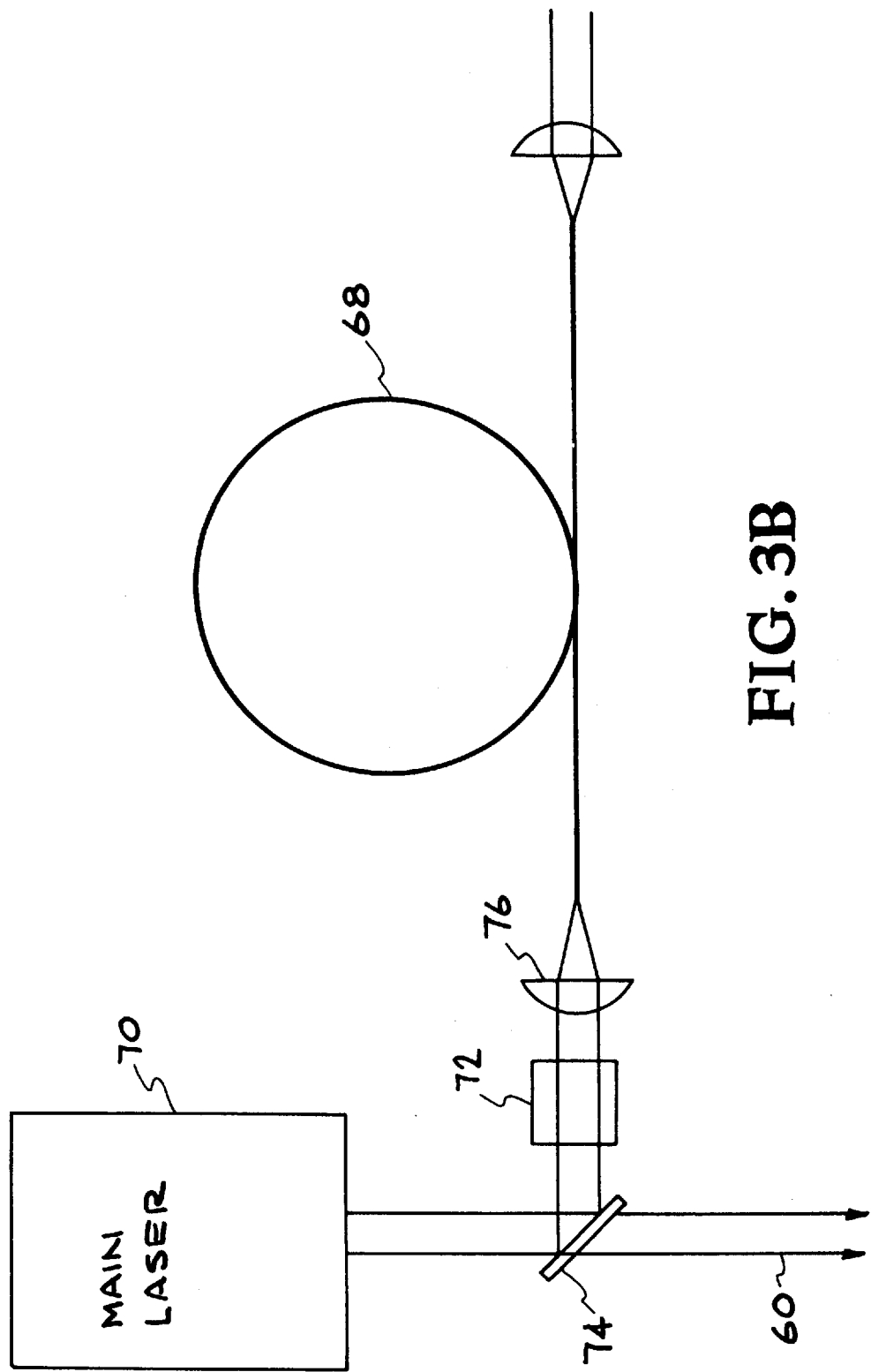

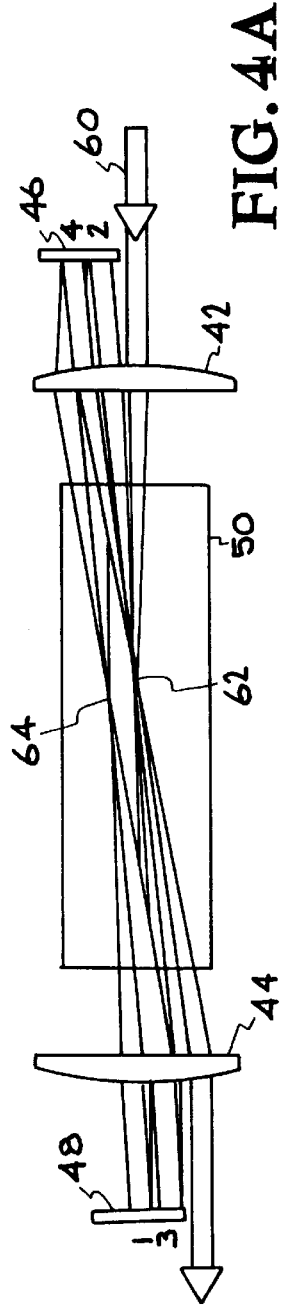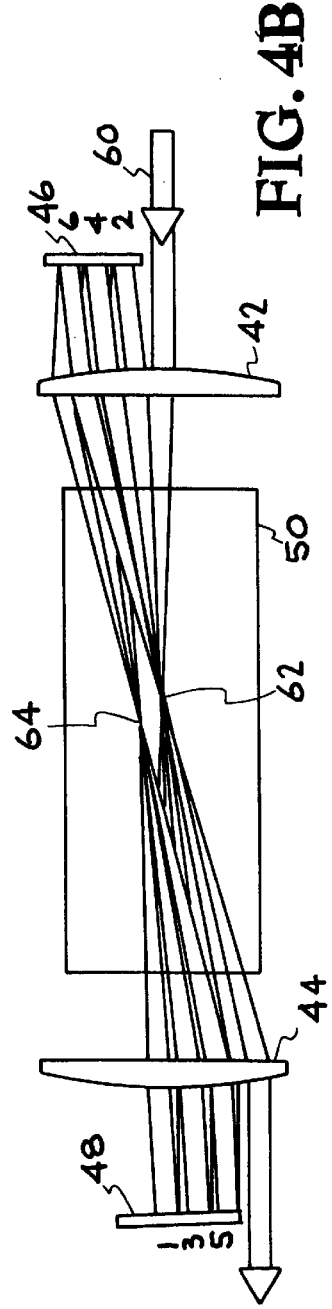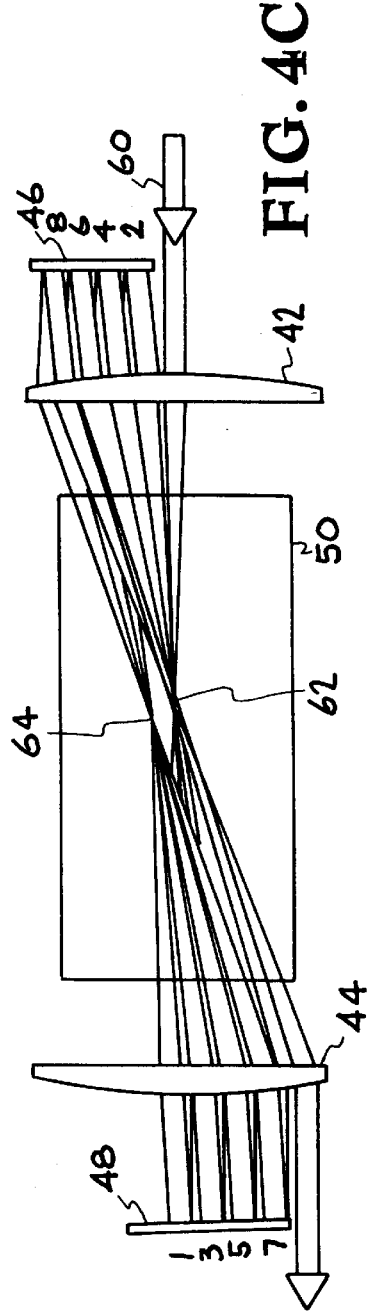

ALL SOLID-STATE SBS PHASE CONJUGATE MIRROR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to phase conjugation, and more specifically, it relates to a Stimulated Brillouin Scattering phase conjugate mirror constructed of all solid-state materials.

2. Description of Related Art

Phase conjugate mirrors employing Stimulated Brillouin Scattering (SBS) have become very useful and in some cases essential in high power laser systems. These mirrors, placed at the end of an amplifier chain somewhere in the mid-range of the amplification path, reflect the light with a phase wave front that is nearly exactly the inverse of that of the incoming laser beam. The reflected light retraces its path through the amplifiers, canceling out any wave front distortions that accumulated in the forward direction. This results in near aberration free output beams that exhibit the minimum beam divergence allowed by optical diffraction, hence the description "diffraction-limited."

The mechanism responsible for the reflectivity of the SBS mirrors is the generation of an intense acoustic wave inside the SBS nonlinear material. This acoustic wave serves as a very efficient Bragg grating which reflects the incoming light. Since the acoustic grating travels at the speed of sound through the material, in the same direction as the input light, the reflected light is frequency shifted from the input light by 100 Mhz to >10 Ghz, depending on the SBS medium. The frequency shifted output is referred to as the Stokes wave and the frequency shift is referred to as the Stokes shift. The active material for the conjugators has most often been a liquid or high pressure gas. However, there is a strong incentive to design a Stimulated Brillouin Scattering (SBS) phase conjugate mirror that does not use a liquid or a high pressure gas as the nonlinear medium. The very high gas pressure (50–100 atm) required for gases such as Xe or $N_2$ poses a potential hazard to the laser user and, its local environment and makes much more challenging the laser's successful operation over the large temperature ranges required for some operations in the field. The safety issues associated with the gas pressure also significantly increase the laser's cost. The two liquid SBS media which have been successfully demonstrated in working high average power solid state laser systems (carbon tetrachloride and Freon 113) are both banned for delivery for DoD applications because of their suspected role in ozone depletion. Their manufacture is scheduled to be discontinued in the very near future. Other useful liquids, such as the metal tetrachlorides (Ge, Ti, and Sn) are chemically unstable when exposed to the atmosphere, producing toxic and highly corrosive reaction products such as HCl.

As evidenced in "Wavefront Inversion in Induced Mandel'shtam-Brillouin Scattering in a Glass Without Failure," Sov. Phys. Tech. Phys. 25, 645–646 (1980), it has been recognized for many years that fused silica exhibits an SBS gain coefficient comparable in magnitude to that of many commonly used liquids and high pressure gases. When fused silica is used as the nonlinear medium in an SBS mirror, however, input pulses with energies above threshold for stimulated Stokes return often cause material breakdown and damage at the optical focus in the glass. This has sometimes been partially alleviated by using very long focal length lenses to decrease the beam irradiance at focus. This is not a good solution since, not only does this result in a physically large and unwieldy device, it also causes unacceptable temporal reshaping and shortening of the reflected pulse. In the above reference, breakdown was observed for all focal lengths of <50 cm.

An optical architecture was proposed in "Methods for SBS Threshold Reduction," A. M. Scott, et al., Naval Research Laboratory, NRL/FR/5640--94-9704. that uses three foci in a liquid SBS gain medium, with the first and third physically overlapping, to reduce the energy threshold of an SBS mirror. However, the present inventors have recognized that the SBS enhanced four-wave-mixing process of this architecture has a far more profound effect on the performance of an SBS phase conjugate mirror than to merely reduce the energy threshold. By providing a feedback path for the Stokes light, the output of the SBS loop architecture is not dependent on noise generated at optical focus to sustain it. This provides very high temporal stability, eliminating potential phase drifts or jumps in the reflected light. It is now understood that these instabilities are the source of the damage that has been observed in previous experience with solid state SBS gain media. The SBS nonlinear gain coefficient for fused silica is larger than that for competing nonlinear processes such as self-focusing and multi-photon absorption. For this reason, the SBS process might be expected to dominate the light interaction in the medium, shielding the optical focus from an irradiance high enough for the competing processes to reach threshold. However, this is not the case in the presence of temporal instabilities during the pulse. The transiency introduced by these instabilities allows the competing processes to reach threshold and generate optical breakdown, damaging the glass.

FIGS. 1 and 2 show prior art optical configurations of solid-state SBS phase conjugate mirrors. FIG. 1 shows a conventional configuration in which an incoming laser pulse 10 is simply focused into the SBS medium 12 with a single lens 14. FIG. 2 shows the configuration described in the Scott, et al. reference described above in which two of three foci overlap to form a four-wave-mixing resonance. A laser beam 20 is focused into the SBS medium 22 with lens mirror 24. After passing through a focus at 26, diverging beam 20 is collimated by lens 28 and reflected by a high reflector (HR) 30 back into the SBS medium 26 and brought to a focus at 32 by lens 28. Lenses 24 and 28 together comprise a confocal lens pair. After passing through focus 32, beam 20 diverges and is collimated by lens 24. This collimated beam is reflected by high reflector 34 through lens 24, focus 26, and lens 28 to exit the system.

The optimal configuration of a multi-pass, multi-resonant optical architecture can completely eliminate temporal phase instability during the stimulated scattering process and thus prevent any damage to the solid state SBS medium. Since short focal length lenses can now be used, the result is a very compact and physically rugged phase conjugate mirror which requires no liquids or high pressure gasses.

SUMMARY OF THE INVENTION

It is an object of the present invention to provide a solid-state Stimulated Brillouin Scattering phase conjugate mirror.

A stimulated Brillouin scattering (SBS) phase conjugate laser mirror has been designed which uses a solid-state nonlinear gain medium instead of the conventional liquid or high pressure gas medium. The concept has been effectively demonstrated using common optical-grade fused silica. An energy threshold of 2.5 mJ and a slope efficiency of over 90% were achieved, resulting in an overall energy reflectivity of >80% for 15 ns, 1 μm laser pulses. This all solid state phase conjugator is safer, more reliable, and more easily manufactured than prior art designs. It allows nonlinear wavefront correction to be implemented in industrial and defense laser systems whose operating environments would preclude the introduction of potentially hazardous liquids or high pressure gases.

The invention uses a doubly-resonant (5 foci) SBS loop geometry which completely eliminates temporal instabilities, resulting in an all solid-state SBS mirror design with high reflectivity and free of optical damage problems. The inventors have recognized that a multi-resonant design is possible that incorporates beams which overlap in two separate focal points inside the SBS medium. This allows the number of gain passes to be increased to an arbitrary number of passes (5, 7, 9, and so on), limited only by the clear aperture of the optical components and the SBS nonlinear medium.

Optionally, the threshold reduction and performance enhancement available from reflectivity of the SBS mirror can be further improved by focusing the light transmitted all the way through the mirror into a multi-mode fiber of the same material as the SBS loop nonlinear medium. The light gain guided in this fiber can "seed" the SBS in the resonant SBS loop. The loop will control the spatial characteristics. A variation to this improvement is to externally "seed" the initiation of SBS return by coupling a small fraction of the output from the originating laser beam first into a frequency shifting mechanism (a phase modulator or acousto-optic shifter) and then into a multi-mode fiber for transport to the back side of the SBS conjugator. The frequency shifting mechanism adds the appropriate Stokes frequency shift (700 MHz for fused silica) to the light so that it can function as an SBS seed. The delay time through the modulator and fiber length must be chosen (by appropriate length of fiber) such that the seed pulse arrives at the same time as the normal transmission through the SBS mirror.

The solid state SBS phase conjugator has wide application in ruggedized, MIL-spec, fielded lasers for DoD applications. By eliminating potentially dangerous high pressure gas cells or liquids that pose a threat to operators or the environment, this device facilitates the introduction of SBS phase conjugation into commercial and industrial high average power laser applications. The special handling requirements for liquids and gases are thus replaced by well developed optical fabrication methods for glass and crystalline materials.

BRIEF DESCRIPTION OF THE DRAWINGS

FIG. 3B shows the pump laser for the multi-mode fiber and the SBS mirror.

FIGS. 4A–C shows configurations made possible by the optical geometry of this invention which have 5, 7, and 9 passes through the SBS medium.

DETAILED DESCRIPTION OF THE INVENTION

Figure 1:
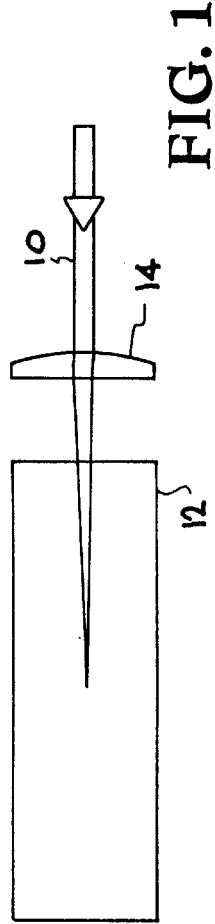
FIG. 1 shows a prior art SBS phase conjugate mirror having a liquid or gas medium.
Figure 2:
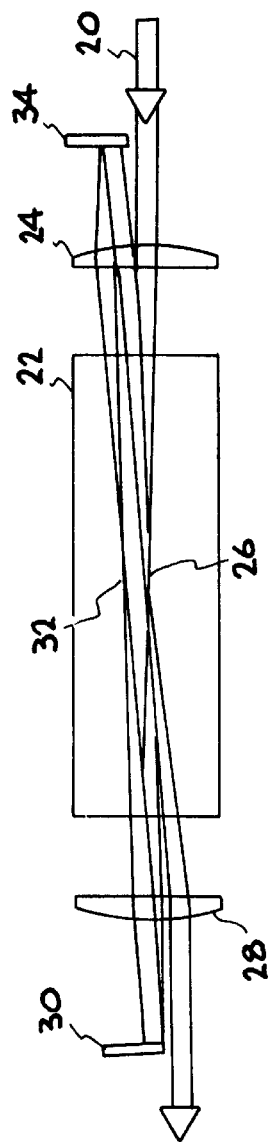
FIG. 2 shows a prior art 3 foci SBS loop geometry phase conjugate mirror having a liquid or gas SBS gain medium.
Figure 3A:
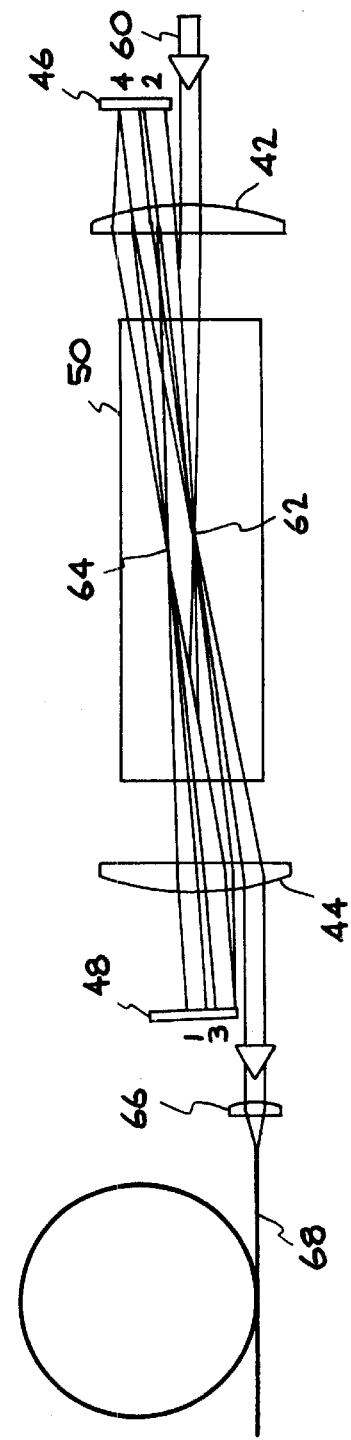
FIG. 3A shows the doubly resonant SBS loop geometry phase conjugate mirror of the present invention, incorporating a wave-guide fiber SBS oscillator to seed the Stokes generation.

The solid-state SBS conjugator of the present invention is illustrated in FIG. 3A. It has a doubly resonant configuration incorporating five foci distributed in two overlapping regions. The SBS conjugator includes lenses 42 and 44 (which together comprise a confocal lens pair), a pair of high reflectors 46 and 48, and the solid state SBS medium 50. In operation, an input laser pulse 60 is brought to a focus 62 by lens 42. The beam is then re-collimated by lens 44 and reflected from the surface of high reflector (HR) 48, at point 1, back through lens 44, focus 64 and lens 42 to be reflected from point 2 on HR 46. This reflected beam is focused by lens 42 through focus 62, to then propagate through lens 44 onto spot 3 of HR 48 and then to be reflected back into SBS medium 50 to be focused by lens 44 at point 64. The beam then is recollimated by lens 42 and reflected from HR 46 at spot 4 back into the SBS medium for one last pass through focus 62 before exiting the system through lens 44.

The reflectivity of the SBS phase conjugate mirror of FIG. 3A can be further increased by focusing (with lens 66) the light transmitted all the way through the mirror into a multi-mode fiber 68 of the same material as the SBS loop nonlinear medium 50. A very low threshold can be achieved due to the wave-guide properties of the fiber 68, although poor wavefront reversal (phase conjugation) performance is typically observed. In this case, however, the SBS return, which spontaneously is generated in the fiber from the fiber oscillator, serves simply to seed the light build-up in the SBS loop mirror, increasing overall stability and further reducing the nonlinear threshold. An even more definitive way to initiate a "seed" to initiate the SBS, as shown in FIG. 3B, is to couple a small fraction of the light from the originating laser system 70 through an appropriate frequency shifter 72 (phase modulator or acousto-optic shifter) and then, with e.g., a beamsplitter 74 and a lens 76, into a multi-mode fiber 68 who's output couples this light into the transmission side of the SBS phase conjugate mirror. The applied frequency shift is the same at the Stokes shift normally generated in the SBS process and allows this external light to seed a very well defined temporal start to the SBS process. This latter technique does not require the fiber to be made of the same material as the phase conjugator because the Stokes return is generated by the frequency shifter and not within the fiber. By appropriately tailoring the length of the fiber, the arrival time of the "seed" is made to match the start time of the normal SBS process. The seed pulse initiates a strong temporal start to the SBS process and the loop SBS geometry controls the spatial and hence wavefront content.

Referring to FIGS. 3A, 3B and 4A–C, the relative position of the reflected spots on the high reflectors 46 and 48 is indicated by the numbers adjacent to each mirror. The number coincides with the pass number of beam 60 through the SBS medium 50. The input pulse 60 propagates through the SBS medium to point 1, and continues to be reflected back and forth through the medium to successive points 2, 3 and 4. In FIGS. 3 and 4A, after reflecting from HR 46 at point 4, the beam passes once more through the SBS medium before exiting the system. The optical geometry described has 5 gain passes. However, by sliding reflector 48 to intercept the transmitted beam, additional passes which are added in pairs, result.

Referring to FIGS. 4B and 4C, each set of passes added by the translation of reflector 48 into the output beam are automatically aligned through foci 62 and 64. FIG. 4B shows a 7 pass doubly resonant SBS loop geometry. The input pulse 60 propagates through the SBS medium to point 1, and continues to be reflected back and forth through the medium to successive points 2 through 6. After reflecting from HR 46 at point 6, the beam passes once more through the SBS medium before exiting the system. FIG. 4C shows a 9 pass doubly resonant SBS loop geometry. The input pulse 60 propagates through the SBS medium to point 1, and continues to be reflected back and forth through the medium to successive points 2 through 8. After reflecting from HR 46 at point 8, the beam passes once more through the SBS medium before exiting the system. The SBS mirror can be configured to any odd number of gain passes greater than or equal to 3.

Figure 5:
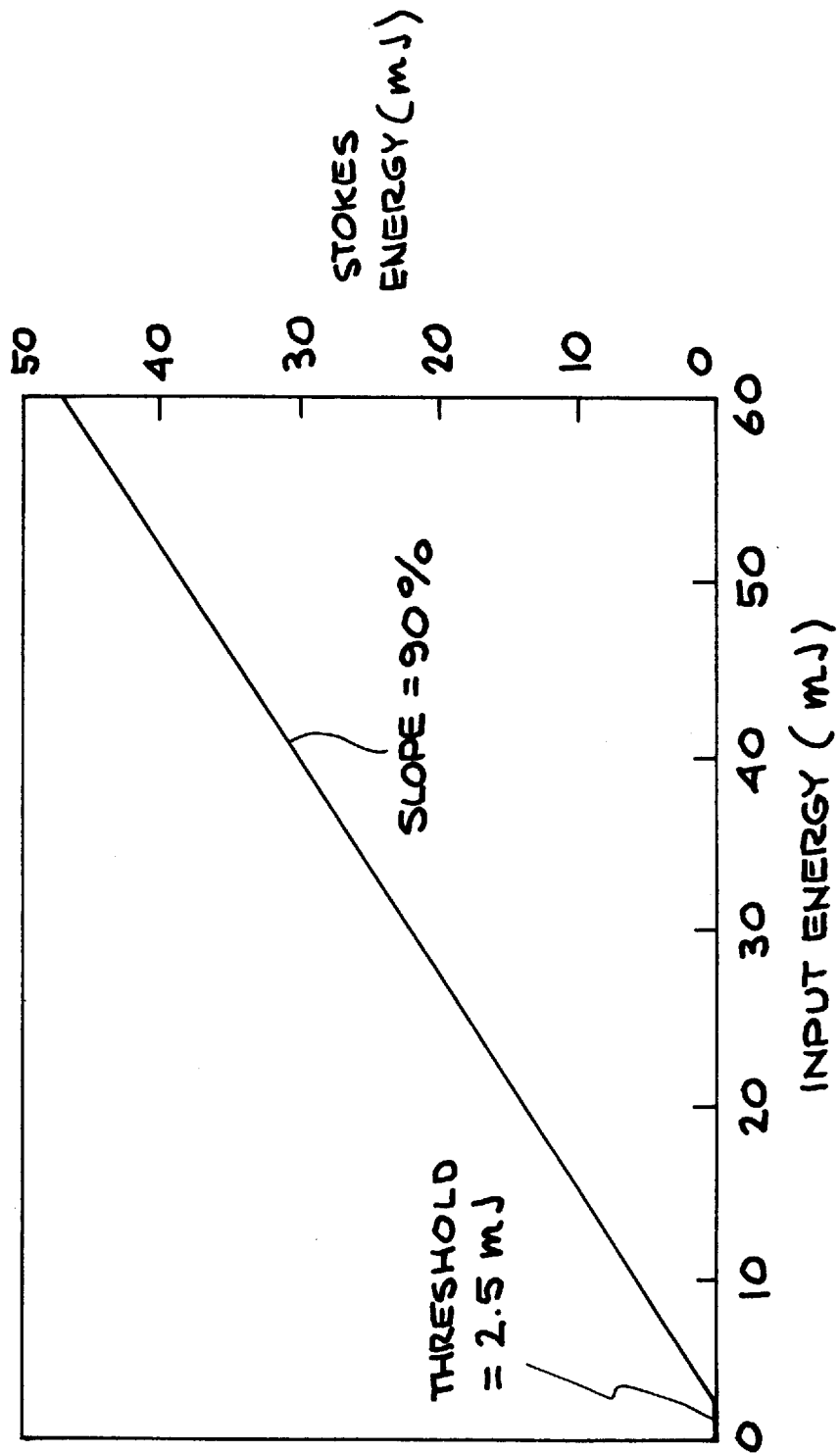
FIG. 5 shows a graph of SBS reflectivity measured in a fused silica SBS phase-conjugate mirror using the five-pass architecture of the present invention.

The SBS medium for the demonstration of this concept was simply a 15 cm long block of fused silica with its end faces polished approximately parallel and anti-reflection coated for a wavelength of 1 $\mu$m. A quarter-waveplate placed at the input to the conjugator served two purposes. The first was to provide a 90° polarization rotation of the reflected light, allowing it to be optically isolated from the input by a polarizing beamsplitter. The second was to introduce circular polarization in order to lower the nonlinear gain for self-focusing in the fused silica. It is well known that, for fused silica, the nonlinear index is significantly higher for linear polarization than for circular polarization. Using 15 ns input pulses generated by a 1.053 $\mu$m Nd:YLF laser, an energy reflectivity of >80% was demonstrated. As shown in FIG. 5, the measured threshold energy was approximately 2.5 mJ and a maximum slope efficiency of 90% was reached.

Many thousands of laser shots were directed into the phase conjugator with no measurable damage. When the beam was blocked between the glass block and the second lens, the system became a simple, single focus SBS mirror. In this case, abrupt and catastrophic damage was seen to occur above input energies of 30–40 mJ. This was evidenced by the termination of Stokes output, bright flashes at focus, and elongated damage tracks in the material.

Fused silica is not the only, nor possibly the best, solid state material for the SBS medium in every application. Gains as high as 25 cm/GW have been measured in the crystal DLAP which exceed that for fused silica by 4–5 times. This enables energy thresholds of well below 1 mJ. Any solid state material that exhibits an adequate electrostrictive effect giving rise to SBS gain can be usefully employed in the optical architecture of this invention. However, fused silica remains an attractive candidate material for its ready supply, straightforward fabrication and optical coating, and very low linear absorption coefficient.

Changes and modifications in the specifically described embodiments can be carried out without departing from the scope of the invention, which is intended to be limited by the scope of the appended claims.

The invention claimed is:

1. A solid-state Stimulated Brillouin Scattering (SBS) phase conjugate mirror, comprising:

a pair of high reflectors having their mirrored surfaces facing each other;

a confocal lens pair placed between said pair of high reflectors, wherein said confocal lens pair together with said pair of high reflectors form a doubly resonant configuration incorporating at least five foci distributed in two overlapping regions; and a solid-state SBS gain medium placed between said confocal lens pair.

2. The solid-state Stimulated Brillouin Scattering (SBS) phase conjugate mirror of claim 1, wherein temporal phase instabilities are completely eliminated during the stimulated scattering process that occurs within said solid state SBS gain medium when an input pulse propagates on said doubly resonant configuration.

3. The solid-state Stimulated Brillouin Scattering (SBS) phase conjugate mirror of claim 1, wherein said solid-state SBS gain medium comprises fused silica.

4. The solid-state Stimulated Brillouin Scattering (SBS) phase conjugate mirror of claim 1, wherein said solid-state SBS gain medium has end faces polished approximately parallel, said end faces each having an anti-reflection coating.

5. The solid-state Stimulated Brillouin Scattering (SBS) phase conjugate mirror of claim 1, wherein said solid-state SBS gain medium has end faces polished approximately parallel, said end faces each having an anti-reflection coating for a wavelength of 1 $\mu$m.

6. The solid-state Stimulated Brillouin Scattering (SBS) phase conjugate mirror of claim 1, further comprising a quarter-waveplate placed at an input to the conjugate mirror to provide a 90° polarization rotation of reflected light, thus allowing said solid-state SBS gain medium to be optically isolated from an input pulse source by a polarizing beamsplitter, and to introduce circular polarization in order to lower the nonlinear gain for self-focusing in said solid-state SBS gain medium.

7. The solid-state Stimulated Brillouin Scattering (SBS) phase conjugate mirror of claim 1, wherein said solid-state SBS gain medium comprises DLAP crystal.

8. The solid-state Stimulated Brillouin Scattering (SBS) phase conjugate mirror of claim 1, wherein said solid-state SBS gain medium comprises any solid state material having electrostrictive properties.

9. The solid-state Stimulated Brillouin Scattering (SBS) phase conjugate mirror of claim 1, wherein said pair of high reflectors comprises a high reflector (HR) 46 and a high reflector 48, wherein said confocal lens pair comprises a lens 42 and a lens 44, wherein an input laser pulse comprising pulse 60 is brought to a focus 62 by lens 42, wherein said pulse 60 is then re-collimated by lens 44 and reflected from the surface of high reflector 48, at point 1, back through lens 44, focus 64 and lens 42 to be reflected from point 2 on HR 46, wherein said pulse 60 is then focused by lens 42 through focus 62, propagates through lens 44 onto spot 3 of HR 48, is reflected back into SBS medium 50 and focused by lens 44 at point 64, wherein said pulse 60 is recollimated by lens 42 and reflected from HR 46 at spot 4 back into said solid-state SBS gain medium for one last pass through focus 62 before exiting the system through lens 44.

10. The solid-state Stimulated Brillouin Scattering (SBS) phase conjugate mirror of claim 1, further comprising a laser pumped multi-mode fiber comprising the same material as said solid-state SBS gain medium, said SBS phase conjugate mirror further comprising a lens, wherein the reflectivity of said solid-state Stimulated Brillouin Scattering (SBS) phase conjugate mirror is increased by focusing (with said lens) light transmitted all the way through said SBS phase conjugate mirror into said multi-mode fiber, wherein a very low SBS threshold can be achieved due to wave-guide properties of said multi-mode fiber, wherein light returning from said multi-mode fiber seeds light build-up in said solid-state SBS gain medium, increasing overall stability and further reducing the nonlinear threshold.

11. The solid-state Stimulated Brillouin Scattering (SBS) phase conjugate mirror of claim 1, wherein said confocal lens pair together with said pair of high reflectors form a doubly resonant configuration incorporating at least 7 foci distributed in two overlapping regions.

12. The solid-state Stimulated Brillouin Scattering (SBS) phase conjugate mirror of claim 1, wherein said confocal lens pair together with said pair of high reflectors form a doubly resonant configuration incorporating at least 9 foci distributed in two overlapping regions.

13. A solid-state Stimulated Brillouin Scattering (SBS) phase conjugate mirror, comprising:
  a pair of high reflectors having their mirrored surfaces facing each other;
  a confocal lens pair placed between said pair of high reflectors, wherein said confocal lens pair together with said pair of high reflectors form a doubly resonant configuration incorporating any odd number of gain passes greater than or equal to 3 distributed in two overlapping regions; and
  a solid-state SBS gain medium placed between said confocal lens pair.

14. A solid-state Stimulated Brillouin Scattering (SBS) phase conjugate mirror, comprising:
  a pair of high reflectors having their mirrored surfaces facing each other;
  a confocal lens pair placed between said pair of high reflectors, wherein said confocal lens pair together with said pair of high reflectors form a doubly resonant configuration incorporating any odd number of gain passes greater than or equal to 5 distributed in two overlapping regions; and
  a solid-state SBS gain medium placed between said confocal lens pair.

15. A solid-state Stimulated Brillouin Scattering (SBS) phase conjugate mirror, comprising:
  a solid-state SBS gain medium:
    a doubly resonant configuration incorporating any odd number of gain passes greater than or equal to 3 distributed in two overlapping regions within said solid-state SBS gain medium.

16. The solid-state Stimulated Brillouin Scattering (SBS) phase conjugate mirror of claim 15, further comprising a multi-mode fiber comprising the same material as said solid-state SBS gain medium, said SBS phase conjugate mirror further comprising a lens, wherein the reflectivity of said solid-state Stimulated Brillouin Scattering (SBS) phase conjugate mirror is increased by focusing (with said lens) light transmitted all the way through said SBS phase conjugate mirror into said multi-mode fiber, wherein a very low SBS threshold can be achieved due to wave-guide properties of said multi-mode fiber, wherein light returning from said multi-mode fiber seeds light build-up in said solid-state SBS gain medium, increasing overall stability and further reducing the nonlinear threshold.

17. A solid-state Stimulated Brillouin Scattering (SBS) phase conjugate mirror, comprising:
  a pair of high reflectors having their mirrored surfaces facing each other;
  a confocal lens pair placed between said pair of high reflectors, wherein said confocal lens pair together with said pair of high reflectors form a doubly resonant configuration incorporating any number of gain passes greater than or equal to 3 distributed in two overlapping regions; and
  a solid-state SBS gain medium placed between said confocal lens pair.

18. The solid-state Stimulated Brillouin Scattering (SBS) phase conjugate mirror of claim 17, further comprising a multi-mode fiber comprising the same material as said solid-state SBS gain medium, said SBS phase conjugate mirror further comprising a lens, wherein the reflectivity of said solid-state Stimulated Brillouin Scattering (SBS) phase conjugate mirror is increased by focusing (with said lens) light transmitted all the way through said SBS phase conjugate mirror into said multi-mode fiber, wherein a very low SBS threshold can be achieved due to wave-guide properties of said multi-mode fiber, wherein light returning from said multi-mode fiber seeds light build-up in said solid-state SBS gain medium, increasing overall stability and further reducing the nonlinear threshold.

19. A solid-state Stimulated Brillouin Scattering (SBS) phase conjugate mirror, comprising:
  a solid-state SBS gain medium:
    a doubly resonant configuration incorporating any number of gain passes greater than or equal to 3 distributed in two overlapping regions within said solid-state SBS gain medium.

20. The solid-state Stimulated Brillouin Scattering (SBS) phase conjugate mirror of claim 19, further comprising a multi-mode fiber comprising the same material as said solid-state SBS gain medium, said SBS phase conjugate mirror further comprising a lens, wherein the reflectivity of said solid-state Stimulated Brillouin Scattering (SBS) phase conjugate mirror is increased by focusing (with said lens) light transmitted all the way through said SBS phase conjugate mirror into said multi-mode fiber, wherein a very low SBS threshold can be achieved due to wave-guide properties of said multi-mode fiber, wherein light returning from said multi-mode fiber seeds light build-up in said solid-state SBS gain medium, increasing overall stability and further reducing the nonlinear threshold.

21. A method for eliminating temporal phase instabilities in a laser pulse, comprising:
  producing a laser pulse; and
  focusing said laser beam into a solid-state Stimulated Brillouin Scattering (SBS) gain medium comprising a doubly-resonant SBS loop configuration which incorporates two separate focal points in said solid-state SBS gain medium, wherein temporal phase instabilities are completely eliminated during the stimulated scattering process that occurs within said solid-state SBS gain medium when said laser pulse propagates on said doubly resonant configuration.

22. The method of claim 21, further comprising focusing said laser pulse into a multi-mode fiber after said laser pulse propagates all the way through said doubly-resonant SBS loop configuration, wherein said multi-mode fiber comprises the same material as said SBS gain medium.

23. The method of claim 22, further comprising coupling a small fraction of the output from said laser pulse (before it passes through said doubly-resonant SBS loop configuration) first into a frequency shifting mechanism selected from a group consisting of a phase modulator and an acousto-optic shifter and then into said laser pumped multi-mode fiber for transport to the back side of the SBS conjugator, wherein the frequency shifting mechanism adds the appropriate Stokes frequency shift (700 MHz for fused silica) to said laser pulse so that it can function as an SBS seed pulse, wherein the delay time through the modulator and fiber length is chosen (by appropriate length of fiber) such that said seed pulse arrives at the same time as the normal transmission through said doubly-resonant SBS loop configuration.

* * * * *